US009085089B2

(12) United States Patent
Noni et al.

(10) Patent No.: US 9,085,089 B2
(45) Date of Patent: Jul. 21, 2015

(54) SUPPORT TRAY FOR EXTRUDED CERAMIC WARE AND METHOD

(75) Inventors: Douglas M Noni, Horseheads, NY (US); Wei Xu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 27 days.

(21) Appl. No.: 12/394,539

(22) Filed: Feb. 27, 2009

(65) Prior Publication Data

US 2010/0219556 A1 Sep. 2, 2010

(51) Int. Cl.

| | |
|---|---|
| ***B29C 47/34*** | (2006.01) |
| ***B28B 1/02*** | (2006.01) |
| ***B28B 11/24*** | (2006.01) |

(52) U.S. Cl.
CPC ................. *B28B 1/02* (2013.01); *B28B 11/243* (2013.01); *B28B 11/248* (2013.01)

(58) Field of Classification Search
CPC ........................................................ B29C 47/34
See application file for complete search history.

(56) References Cited

U.S. PATENT DOCUMENTS

| | | | | |
|---|---|---|---|---|
| 5,406,058 | A * | 4/1995 | Lipp | 219/774 |
| 2005/0167880 | A1* | 8/2005 | Nate et al. | 264/177.12 |
| 2006/0159795 | A1* | 7/2006 | Bergman et al. | 425/174.6 |

FOREIGN PATENT DOCUMENTS

| | | |
|---|---|---|
| CN | 1336316 | 2/2002 |
| CN | 1662286 | 8/2005 |
| EP | 1500481 | 5/2003 |
| EP | 1 604 922 | 12/2005 |
| EP | 1 829 658 | 5/2007 |
| JP | 03012369 A * | 1/1991 |

OTHER PUBLICATIONS

English abstract of JP03012369.*

* cited by examiner

*Primary Examiner* — Larry Thrower
*Assistant Examiner* — Xue Liu
(74) *Attorney, Agent, or Firm* — Joseph M. Homa; Charles A. Greene

(57) ABSTRACT

Honeycomb extrudate is made by extruding a plasticized ceramic-forming batch material to form a length of wet honeycomb extrudate, transferring the extrudate to a support tray, and transferring the tray and extrudate to a dryer, the tray being capable of contactingly supporting greater than one-third of the circumferential surface of the wet extrudate. The extrudate is subject to reduced handling damage, e.g. from forces of gravitational and/or lateral acceleration arising during transfer.

5 Claims, 2 Drawing Sheets

SUPPORT TRAY FOR EXTRUDED CERAMIC WARE AND METHOD

FIELD

The methods and apparatus disclosed herein relate to the manufacture of technical ceramics, and more particularly to the production of ceramic honeycomb products useful, for example, the manufacture of catalytic converters and particulate filters for the treatment of combustion engine exhaust gases.

BACKGROUND

The fabrication of certain ceramic honeycomb structures from ceramic-forming powder mixtures is known. Plasticized mixtures are forced through extrusion dies to form lengths of wet extrudate which are then dried and fired to convert the extruded mixture to strong refractory ceramic materials.

Honeycomb structures can be square or closed cylindrical (circular, oval, elliptical, racetrack) cross-sections transverse to the axis of extrusion and direction of channel orientation in the bodies. The honeycomb channels, which may be of square, triangular, hexagonal, or other cross-sectional shape, are bounded by thin channel walls and can be present in channel densities of, for example, from 15 to 100 channels per $cm^2$ of honeycomb cross-sectional area.

Geometries and materials provide ceramic honeycomb structures with relatively high strength and durability after firing. However, the wet honeycomb extrudate produced earlier in the process is relatively quite soft and subject to damage in the course of further handling, particularly until it has been dried.

Handling can cause shape distortion in wet honeycomb shapes comprising thin web and skin structures, or where especially large and heavy extrudate sections need to be transported. Further, extrudate sections of large diameter or frontal area transverse to the axis of extrusion can suffer from distortion and collapse of the honeycomb channel structure as that structure must bear the weight and withstand the lateral weight shifts of the upper structure in the course of transport.

SUMMARY

The methods and apparatus disclosed herein help to prevent geometric distortion or channel collapse that may be encountered during the handling of wet honeycomb extrudate.

In one aspect the apparatus herein disclosed comprises a support tray for a cylindrical honeycomb extrudate, that extrudate being of a structure having a longitudinal axis and a circumferential surface. The support tray includes a tray body comprising an upper surface, with the upper surface having a concave portion configured to receive the circumferential surface of the cylindrical honeycomb extrudate. Further, the concave portion for receiving the wet extrudate is configured to be capable of contactingly supporting greater than one-third of the circumferential surface of the extrudate.

In another aspect of the present disclosure, a method for manufacturing a ceramic honeycomb is provided. That method includes steps of extruding a plasticized ceramic-forming batch material through a honeycomb extrusion die to form a length of wet honeycomb extrudate having a longitudinal axis and a circumferential surface, and then transferring the length of wet honeycomb extrudate to a support tray. The support tray comprises an upper surface that is capable of contactingly supporting greater than one-third of the circumferential surface of the extrudate. Thereafter the tray bearing the extrudate is transported to a dryer, and the extrudate is dried while supported on the dryer tray.

Computer dynamic simulations of the effects of handling stresses can predict and confirm the observed reductions in honeycomb damage derived from the use of the methods and apparatus disclosed herein. Those simulations show that the increased circumferential support offered to honeycomb extrudate supported by these trays significantly reduce both local contact pressures on wet log surfaces and stress levels inside the log structure to help reduce the possibility of honeycomb channel collapse or distortion during extrudate transport from the extruder to the dryer, and effectively address the hitherto unrecognized effects of lateral acceleration on gravitational cell distortion and collapse in larger honeycomb shapes. Accordingly, through the use of the disclosed methods and apparatus, reductions in wet extrudate handling damage, and therefore increases in the yields of ceramic honeycomb products may be achieved.

DESCRIPTION OF THE DRAWINGS

The methods and apparatus herein disclosed are further described below with reference to the appended drawings, wherein.

DETAILED DESCRIPTION

While the methods and apparatus herein disclosed are suitable for use in a number of different manufacturing environments and production line layouts, they offer particular advantages for those production approaches wherein relatively long sections of wet honeycomb extrudate, termed "logs", are to be cut from the extruder, transported, and dried. Hence the following descriptions and illustrations frequently refer to the production and handling of such logs, particularly including logs of circular cylindrical cross-section, even though the use of the disclosed methods and apparatus are not limited thereto.

Figure 1:
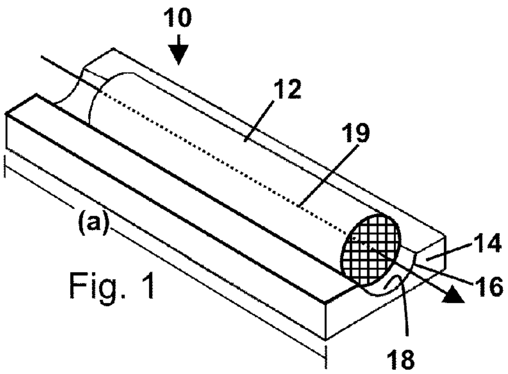
FIG. 1 is a schematic illustration of a conventional support tray and length of honeycomb extrudate supported thereon.

FIG. 1 of the drawings is a schematic illustration, not in true proportion or to scale, of a support tray 10 suitable for supporting a length of extrudate such as a log 12 for transport to a dryer. Typical tray features include an axial length (a) and a transverse cross-section 14 revealing a concave portion 16 defining a support surface 18, that surface being configured to support log 12. Axis 19 in FIG. 1 defines a longitudinal axis of the section of extrudate forming log 12, that axis being parallel to the direction of extrusion and to the orientation of honeycomb channels in that section of extrudate.

A feature of the support trays disclosed herein is the extent to which wet logs are capable of being contactingly supported about major portions of their circumferential surfaces by the concave support surface. Particular embodiments of the disclosed trays include those wherein the concave tray surfaces are configured to contactingly support greater than 40% of the circumferential surface of the extrudate, and in some embodiments even greater than 45% of the circumferential surface of the extrudate.

Adequate support of extrudate sections instill other embodiments of the disclosed trays include those wherein the concave portion is directly adjacent the circumferential surface of the extrudate along a contact line subtended by an included angle of greater than 120 degrees as measured from a longitudinal axis of the extrudate. More generally, that line of contact will be subtended by an included angle of greater than 120 degrees but less than 180 degrees as measured from a longitudinal axis of the extrudate.

Figure 2:
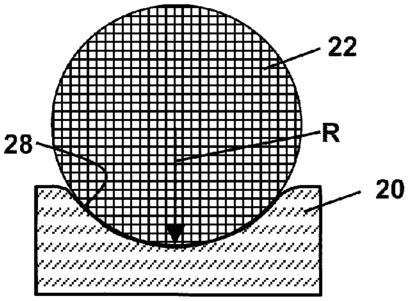
Fig. 2 (prior art)
FIG. 2 is a schematic end view of a section of honeycomb extrudate disposed on a support tray of the prior art.
Figure 3:
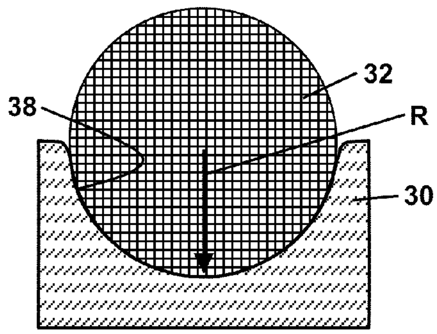
FIG. 3 is a schematic end view of a section of honeycomb extrudate disposed on a support tray in accordance with the present disclosure.

The extent to which the disclosed trays provide more circumferential support to extrudate in the course of transport is reflected in FIGS. 2 and 3 of the drawings. FIG. 2 is a schematic end view of a section of extrudate 22 of circular cross-section that is contactingly supported upon a concave upper surface 28 of a support tray 20 in a prior art design. FIG. 3 is a schematic end view of a section of extrudate 32, also of circular cross-section, contactingly supported on the concave upper support surface 38 of a support tray 30 in accordance with the present disclosure. While little lateral and circumferential support for extrudate section 22 is provided by tray 20, more than 40% of the circumferential surface of extrudate section 32 is in contact with and supported by the concave upper support surface of tray 30.

For the case of extrudate of circular cross-section as illustrated in FIG. 2, the extrudate is of a diameter such that the depth of concave upper support surface 28 of tray 20 is much less than the radius R of extrudate 22. On the other hand, referring to FIG. 3, the depth of the concave upper support surface 38 of tray 30 is approximately equal to the radius R of the extrudate, with the conformal shape of support surface 38 allowing for a much larger proportion of the circumferential surface of extrudate section 32 being supported.

Computer dynamic simulations to study acceleration effects on honeycomb structures of the size, density, and plastic yield characteristics of various plasticized extrudate compositions are helpful in understanding the effects of such acceleration on honeycomb shape distortion. Acceleration effects involving the distortion and collapse of honeycomb channel structure in extrudate regions proximate to tray support surfaces can also be evaluated.

Figure 4:
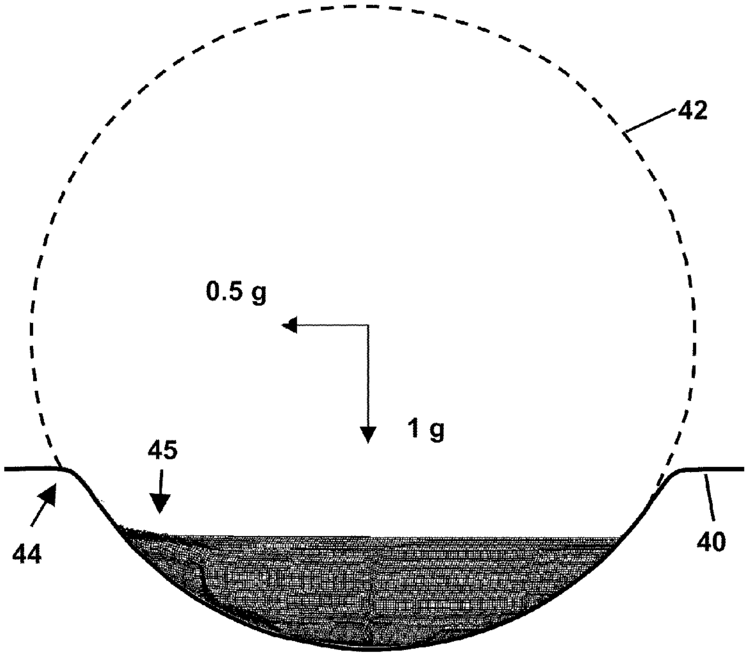
Fig. 4 (prior art)
FIG. 4 illustrates extrudate deformation resulting from lateral acceleration of a support tray of the prior art.

FIG. 4 is an illustration of dynamic simulation output for the case of a modeled honeycomb extrudate 42 supported by a tray support surface profile 40 typical of a prior art tray design. The case shown reflects the simulated extrudate shape deformation resulting from an exposure to a lateral acceleration of 0.5 g and while under a normal gravitational acceleration of 1 g, those accelerations being indicated by the body force diagram superimposed within the outline of modeled extrudate 42. The shape deformation suffered by the circular peripheral shape of the extrudate as a result of these accelerations is most prevalent in a tray-extrudate contact region 44 of FIG. 4. Region 45 is also subject to honeycomb channel distortion and/or collapse from the combined effects of lateral and gravitational acceleration.

Figure 5:
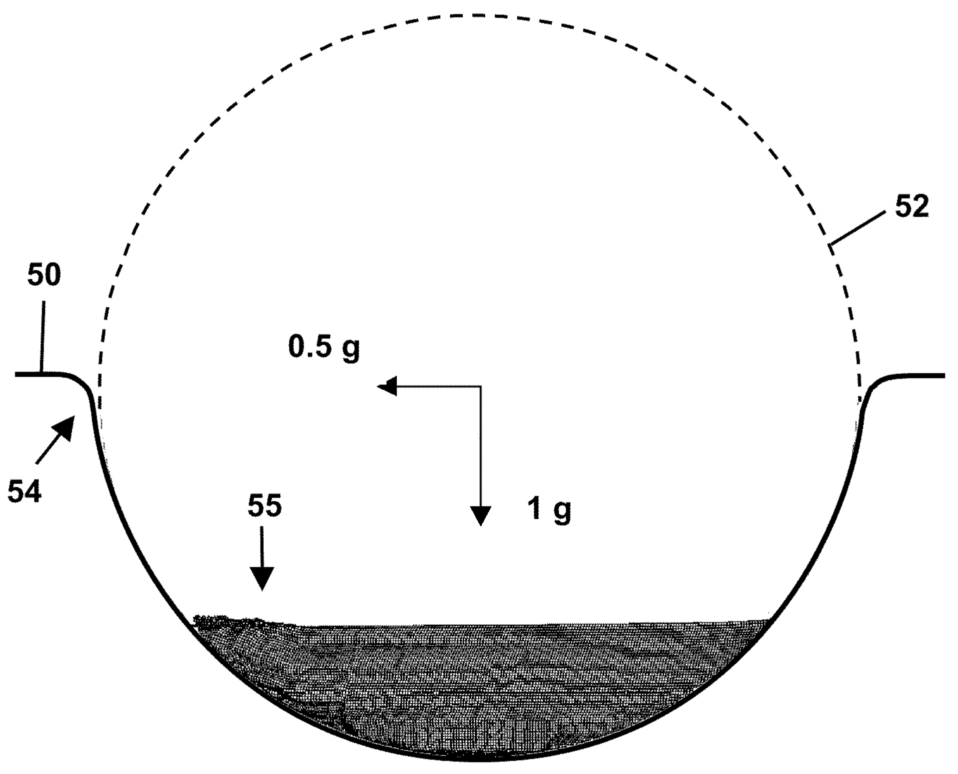
FIG. 5 illustrates honeycomb extrudate deformation resulting from lateral acceleration of a support tray of the present disclosure.

FIG. 5 shows dynamic simulation output, but in this case for a modeled honeycomb extrudate 52 supported by a tray support surface profile 50 designed in accordance with the present disclosure. As seen in FIG. 5, tray profile 50 is of a configuration such that the support surface can contactingly support more than 45% of the circumferential surface of model extrudate 52. Other simulator variables such as the honeycomb structure and plastic properties of the extrudate were the same as for the simulation corresponding to FIG. 4.

FIG. 5 shows that extrudate contact region 54 of extrudate 52 suffers much less shape distortion than extrudate section 42 of FIG. 4 following simulated exposure to the same 0.5 g lateral acceleration and 1 g gravitational acceleration. Also, modeling results indicate that the level of honeycomb channel distortion and/or collapse in modeled honeycomb region 55 of extrudate 52 is substantially less.

Simulation results indicate that, even for extrudates of relatively low elastic modulus and yield strength such as used for ceramic honeycomb production, increasing the extent of circumferential support for the extrudates significantly reduces the incidence of shape defects in dried honeycombs. The modified support surfaces not only reduce circumferential shape deformation, but also reduce honeycomb channel deformation and collapse under combinations of gravitational and lateral accelerations such that honeycomb structures can sustain increased forces in automated extrudate handling systems.

In trays according to some embodiments of the present disclosure that are designed for the support of logs or other extrudate of circular cross-section transverse to its longitudinal axis, as shown for example in FIG. 3 of the drawings, the concave portion defining the support surface defines a circular arc. In trays designed for the support of logs or other extrudate of oval or elliptical cross-section, the concave portion defines an oval or elliptical arc. For still other selected log cross-sections, the concave portion is configured to match the shape of the supported part of the circumferential surface of the extrudate.

In some embodiments, the tray is required to support the extrudate while the extrudate is subjected to a drying process and the tray is made of a material that withstands conditions in the dryer. Where dielectric or microwave heating of the extrudate is the drying method of choice, the tray in some embodiments is fabricated predominantly of one or more materials exhibiting low dielectric loss. Examples of suitable low-loss materials include bonded alumina and aluminosilicate fiber materials.

Various embodiments of the tray used for the practice of the honeycomb manufacturing methods disclosed herein are made by factoring the circumferential size of the extrudate being processed, and the particular manufacturing environment and log transport systems to be employed in the manufacture. In some embodiments of those methods, the step of transporting the tray to the dryer may involve subjecting the extrudate support tray to lateral accelerations not much greater than 0.1 g as measured transversely to the longitudinal axis of the extrudate. In those cases, trays providing extrudate support only modestly greater than that covering one-third of the circumferential surface of the extrudate may be useful. On the other hand, where the step of transporting the tray to the dryer involves subjecting the extrudate to a lateral acceleration of greater than 0.25 g, or even greater than 0.4 g, contacting support over 40% or more of the circumferential extrudate surface may be required.

Where extrudate of large diameter or cross-section transverse to the longitudinal axis of the extrudate is being processed, greater circumferential support may be required to withstand lateral acceleration loads. For example, where the extrudate has a minimum diameter greater than 25 cm and/or where lateral acceleration loads of 0.5 g or greater are anticipated, trays providing contacting support of 45% or more of the circumferential surface of the extrudate may be used.

In conclusion, as the foregoing examples and illustrations have shown, the disclosed tray designs and methods can effectively minimize part distortion due to weight-induced collapse under the lateral forces that may be encountered in material handling systems. Thus geometric defects generated during handling that might otherwise result in the rejection of parts, or require the removal of defective surface material from dried extrudates and corresponding reductions in the useable diameters of the machined parts, can be substantially avoided.

While the foregoing descriptions provide particular examples of methods and apparatus for more effective and economic honeycomb manufacture, it will be appreciated that those examples have been offered for purposes of illustration only, and that other embodiments of the disclosed methods and apparatus may be adapted for similar purposes within the scope of the appended claims.

What is claimed is:

1. A method for manufacturing a honeycomb structure having a circular, oval, or elliptical transverse cross-section comprising the steps of:

extruding a plasticized ceramic-forming batch material through a honeycomb extrusion die to form a length of wet honeycomb extrudate having a longitudinal axis and a circumferential surface;

transferring the length of wet honeycomb extrudate to a support tray body, the tray body comprising a transverse cross-section along its axial length and an upper surface having a concave portion that is configured to receive the extrudate and that is capable of contactingly supporting greater than one-third of the circumferential surface of the extrudate, the concave portion being configured to match the shape of the circumferential surface and defining a circular, oval or elliptical arc and wherein, subsequent to transferring the extrudate to the support tray body, the concave portion is directly adjacent the circumferential surface of the extrudate over 40% or more of the circumferential surface of the extrudate;

transporting the support tray body bearing the extrudate to a dryer wherein, during the transporting of the tray body to the dryer, the extrudate is subjected to a lateral acceleration of greater than 0.25 g, the lateral acceleration being transverse to the longitudinal axis of the extrudate; and drying the extrudate while supported on the support tray body wherein the tray body comprises at least one material selected from bonded alumina and aluminosilicate fibers.

2. The method of claim 1, wherein the circumferential surface has a diameter greater than 25 cm.

3. The method of claim 1 wherein, during the transporting of the tray body to the dryer, the extrudate is subjected to a lateral acceleration of greater than 0.4 g, the lateral acceleration being transverse to the longitudinal axis of the extrudate.

4. The method of claim 3 wherein the extrudate has a minimum diameter transverse to the axis of extrusion of at least 25 cm.

5. The method of claim 1 further comprising firing the dried extrudate to form a ceramic selected from the group consisting of cordierite, aluminum titanate and silicon carbide.

* * * * *